United States Patent [19]

Peretti

[11] Patent Number: 4,518,368

[45] Date of Patent: May 21, 1985

[54] COUPLING

[75] Inventor: Mark F. Peretti, Braintree, Mass.

[73] Assignee: Barry Wright Corporation, Newton Lower Falls, Mass.

[21] Appl. No.: 502,217

[22] Filed: Jun. 8, 1983

[51] Int. Cl.³ .............................. F16D 3/50; F16D 3/52
[52] U.S. Cl. ......................................... 464/70; 464/81; 464/85; 464/94; 464/123; 464/129; 464/152
[58] Field of Search ......................... 464/70, 71, 72, 85, 464/87, 81-83, 89-96, 112, 123, 129, 132, 150, 152, 903-906

[56] References Cited

U.S. PATENT DOCUMENTS

| 2,760,359 | 8/1956 | Wildhaber | 464/70 |
| 2,995,907 | 8/1961 | Orain | 464/90 |
| 3,135,103 | 6/1964 | Black | 464/70 X |
| 3,257,826 | 6/1966 | Peterson | 464/85 |
| 4,368,050 | 1/1983 | Peterson | 464/906 X |

Primary Examiner—John Petrakes
Attorney, Agent, or Firm—Schiller & Pandiscio

[57] ABSTRACT

An improved coupling comprises a driving member rotatable about a first axis, a driven member rotatable about a second axis and a plurality of intermediate floating members disposed between and coupling the driving and driven members so that the rotation axes of the driving and driven members intersect at a common point when the members are angularly misaligned. The floating members are each elongated in one direction. Each floating member has (1) its elongated central axis extending radially with respect to the rotation axes through the common point and lying in a common plane with the elongated central axes of the other floating members, (2), an outer radial end defined by a convex spherical end surface having a center of curvature coincident with the common point, and (3) an inner radial end defined by a concave spherical end surface having a center of curvature coincident with the common point. Bearings, preferably elastomeric laminated bearing units, are used to couple each elongated floating member to the driving and driven members so as to carry, in compression, torque transmitted from the driving member to the driven member, and accommodate in shear pivotal motion resulting from relative angular motion between the driving and driven members.

12 Claims, 8 Drawing Figures

COUPLING

The present invention relates generally to flexible mechanical drive coupling devices, and more particularly to an improved constant velocity coupling.

Many mechanical drive coupling devices have been designed for transmitting rotary motion with a constant velocity ratio between two shafts while allowing the relative positions of the shafts to vary. Devices which are capable of performing this task are commonly called constant velocity or homokinetic joints or couplings. For an analysis of homokinetic couplings see Gilmartin, M. J., et al.; "Displacement Analysis of Spatial 7R Mechanisms Suitable for Constant Velocity Transmission Between Parallel Shafts"; Transactions of the ASME; *Journal of Mechanical Design;* Volume 101; October 1979; pp. 604–613. There has been an increased demand for such couplings in recent years due to the widespread application of such couplings. For example, they are used with various types of industrial machinery including such applications as "robotics", as well as motor driven vehicles, including automobiles, marine vehicles, air vehicles such as helicopters, etc. More recently, a great deal of interest has developed in such couplings for front wheel drive in automobiles so that torque can be delivered from the engine to the front wheels at a constant velocity.

One particular type of coupling which has received considerable attention is the type which utilizes balls to operatively couple a driving shaft to a driven shaft. Such couplings are disclosed in (1) Miller, Fred F.; "Constant Velocity Universal Ball Joints—Their Applications in Wheel Drives"; *Society of Automotive Engineers,* Technical Paper Series; No. 650010, 1965, pp. 63–75; (2) Girguis, S. L., et al.; "Constant Velocity Joints and Their Applications"; *Society of Automotive Engineers,* Technical Paper Series; No. 780098, 1978; pp. 1–17; and (3) U.S. Pat. No. 4,368,050 filed Sept. 8, 1980 on behalf of Robert R. Peterson and assigned to the present assignee.

Typically, the ball joints are divided into two types, the fixed ball joints which accommodate, in particular, angular misalignments between the driving and driven shafts, and the plunging ball joints which typically accommodate axial misalignment and often accommodate some angular misalignment of the shafts. The fixed ball joints often fix the ends of the shafts so that neither is axially movable. The plunging ball joints, on the other hand typically are designed to provide relative end movement of at least one shaft along its axis. Both types can be used to couple a driving shaft to a load. For example, in front or rear drive independent suspension systems, the engine is coupled to the driven wheel through an intermediate shaft. A fixed joint is typically provided at the outboard end of the intermediate shaft nearer the driven wheel to accommodate greater angular misalignments, while a plunging joint is typically provided at the inboard end, nearer the engine, where smaller angular misalignments occur while allowing the length of the intermediate shaft between the joints to vary due to telescoping leads applied to the coupling.

The prior art ball joints used in front or rear drive suspension systems are typically designed so that the driving and driven shafts always rotate about axes which intersect one another and the balls coupling the driving and driven shafts are radially spaced from and circumferentially distributed about the intersection point of the axes. The balls are movable in spherically-curved grooves so that the driving and driven shafts can pivotally move with respect to one another about the common intersection point of the axes. In order to maintain constant velocity between the driving and driven shafts, the ball grooves must be constructed in a manner such that the centers of all the drive balls lie in a common plane (sometimes referred to as the "homokinetic" plane) which extends through and always bisects the common intersection point of the rotation axes.

The type of ball groove design determines whether the coupling is a fixed joint or plunging joint. Fixed joints usually fix the ends of the driving and driven shafts so that they will not appreciably move in their respective axial directions, but can move angulary with respect to one another about a point located at the intersection of the two rotation axes in the homokinetic plane. Relative axial motion of the driving and driven members is, however, permitted in the plunging joint. The plunging joints are also typically capable of accommodating some angular misalignment.

Because of the design of many of the ball joints, they require relatively close manufacturing tolerances, and accordingly the manufacturing costs of these joints are relatively high. Further, the metal-to-metal contact between the various moving parts generates friction and heat and thus energy losses, and transmits noise and vibration. Often backlash will occur in response to low reverse torques.

The durability of the prior art ball joints is largely dependent upon joint size, sound metallurgy, tight manufacturing tolerance controls, correct lubricant, and integrity of the boot seal which maintains adequate lubrication in the joint.

Adequate lubrication is critical to the operation of a coupling of the prior art couplings described. In coupling applications such as in front drive suspension systems, where little angular misalignment is provided during normal operations, the joint will not necessarily immediately fail upon failure of the boot seal so long as it is replaced relatively quickly. However, lubricant can easily dry up and/or become contaminated leading to premature failure of the joint.

U.S. Pat. No. 4,368,050 discloses an improved ball joint type coupling, hereinafter referred to as the "Peterson Ball Joint Coupling" for convenience, which eliminates all lubrication requirements, substantially eliminates all friction and heat between the various bearing surfaces, greatly reduces power losses, substantially eliminates generating or transmitting noise and vibration, relaxes manufacturing tolerance requirements, is more economical to manufacture, and substantially eliminates backlash at low reverse torques.

The preferred embodiment of the Peterson Ball Joint Coupling comprises a driving member rotatable about a first axis and a driven member rotatable about a second axis. A transition member rotates with the driving member about the first axis and includes a first plurality of grooves radially spaced from and circumferentially distributed around the first axis. A second transition member rotates with the driven member about the second axis and includes a second like plurality of grooves, each disposed radially opposite to a corresponding one of the grooves of the first plurality in a mutually confronting manner. A like plurality of balls are each disposed in a corresponding one of the first plurality of grooves and the opposing one of the second plurality of grooves. Laminated bearing means comprising alternating layers of resilient and nonextensible materials is disposed between the driving member and the first transition member. The laminated bearing means carries, in compression, torque transmitted from the driving member to the driven member and carries, in shear, shearing motion between the driving member and the first transition member. Second laminated bearing means comprising alternating layers of resilient and nonextensible materials is disposed between the driven member and the second transition member. The second laminated bearing means carries, in compression, torque loads transmitted from the driving member to the driven member and carries, in shear, shearing motion between the driven member and the second transition member. In the preferred fixed joint embodiment of the coupling device, the first and second laminated bearing means are designed to be in shear in response to relative angular misalignment between the driving and driven members from their respective rotation axes.

It is a general object of the present invention to provide an improvement over the Peterson Ball Joint Coupling.

A more specific object of the present invention is to provide a coupling joint assembly having many advantages of the Peterson Ball Joint Coupling.

Another object of the present invention is to provide a coupling joint assembly having greater torque carrying capability relative to a comparable Peterson Ball Joint Coupling.

And another object of the present invention is to provide a coupling joint assembly requiring fewer floating members than provided in the Peterson Ball Joint Coupling in order to carry the same torque load.

Yet another object of the present invention is to provide an improved coupling joint assembly of the type utilizing elastomeric bearings having less elastomeric sections for a given torque load than provided by the Peterson Ball Joint Coupling.

Still another object of the present invention is to provide an improved coupling joint assembly having a simpler design than provided by the Peterson Ball Joint Coupling.

These and other objects are achieved by a coupling device comprising a driving member mounted for rotation about a first axis, a driven member mounted for rotation about a second axis, and a plurality of intermediate floating members circumferentially spaced around the first and second axes and coupling the driving and driven members so that the first and second axes tend to intersect at a common point. Each of the floating members is elongated in one direction and has (1) an elongated central axis extending radially with respect to the first and second axes through the common point and lying in a common plane with the elongated central axes of the other floating members, (2) an outer radial end defined by a convex spherical end surface having a center of curvature coincident with the common point, and (3) an inner radial end defined by a concave spherical end surface having a center of curvature coincident with the common point. The coupling device also comprises first means for coupling the inner radial end of each of the floating members to one of the driving and driven members, the first means including bearing means disposed between each floating member and the one member. Second means are provided for coupling the outer radial end of each of the floating members to the other of the driving and driven members, the second means including bearing means disposed between each floating member and the other of the driving and driven members. The bearing means of the first and second means carries, in compression, torque transmitted between the driving and driven members and accommodates, in shear, relative pivotal motion between the driving and driven members about the common point when angular misalignment occurs.

Other objects of the invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 2:
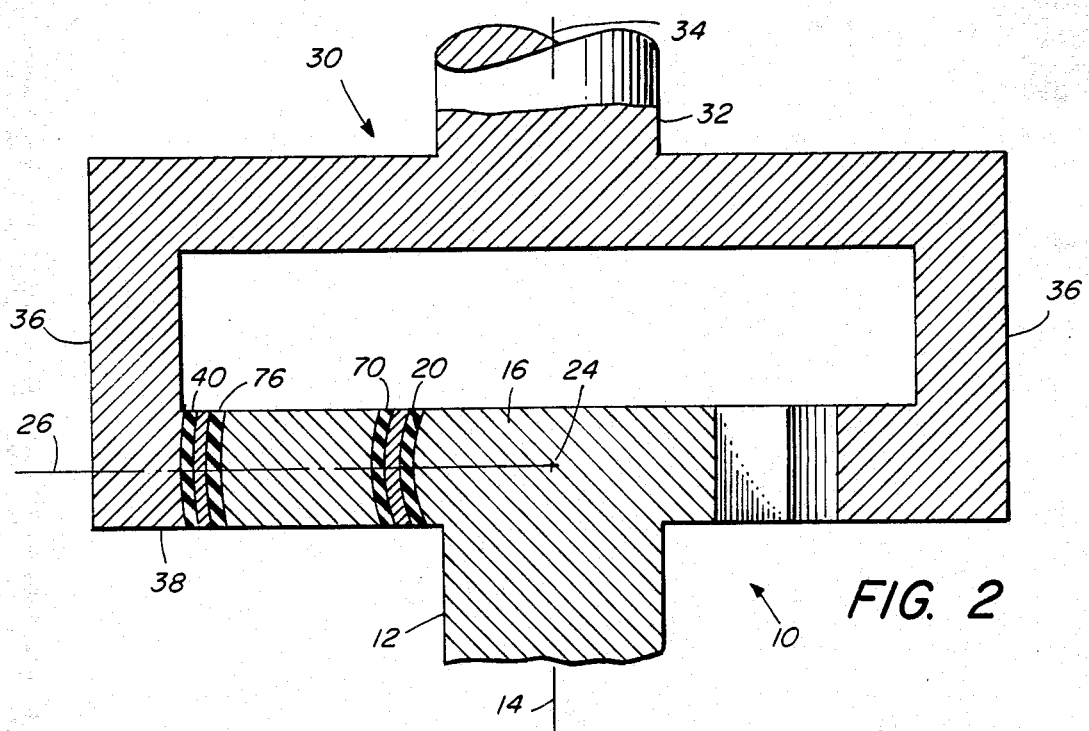
FIG. 2 is a cross-sectional view taken along line 2—2 of FIG. 1.
Figure 1:
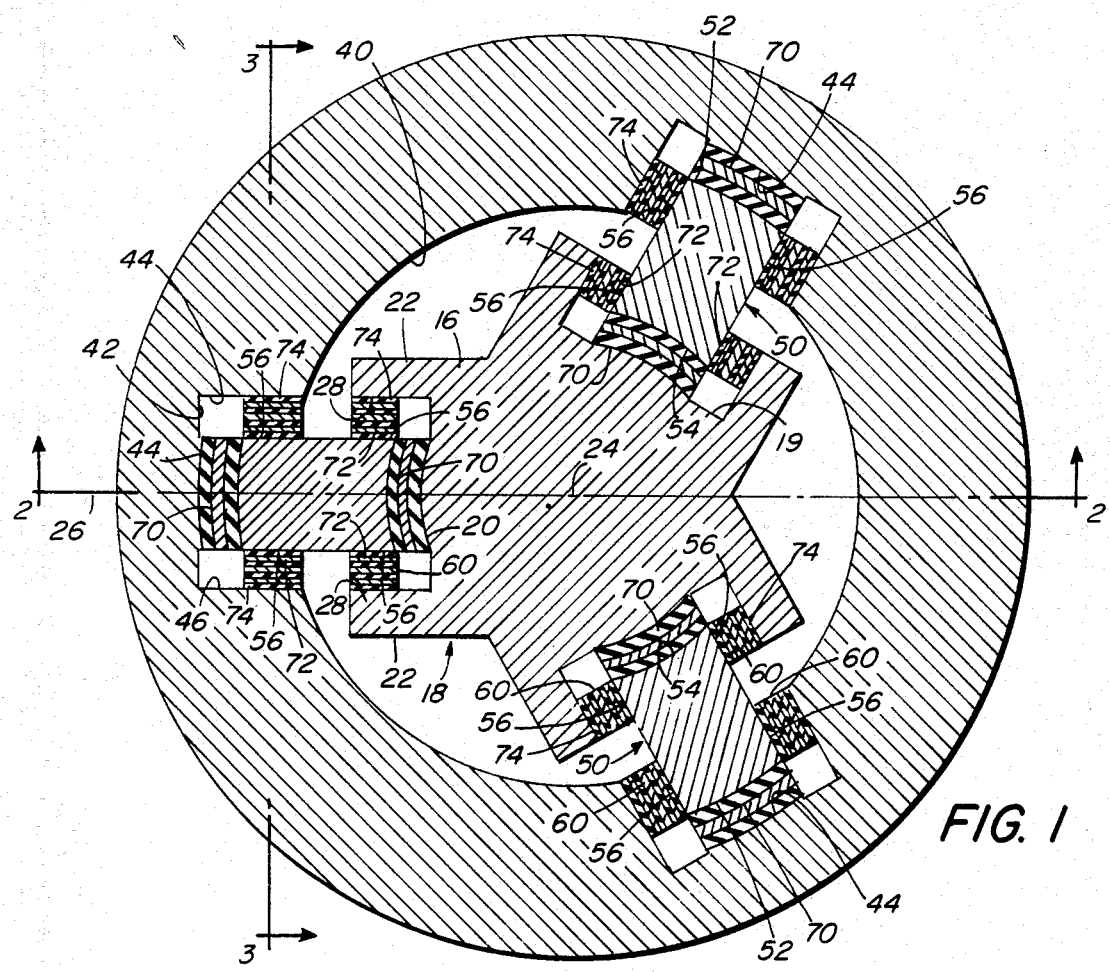
FIG. 1 is a radial cross-sectional view of the preferred embodiment of the coupling device of the present invention.
Figure 3:
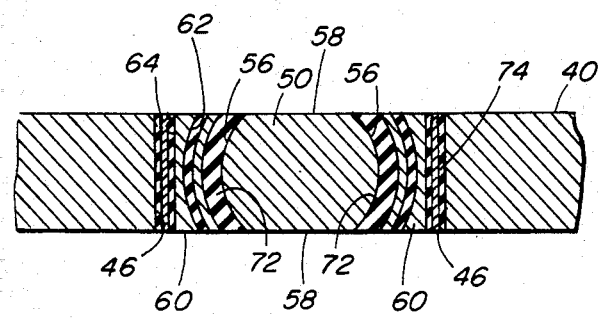
FIG. 3 is a cross-sectional view, partially cut away, taken along line 3—3 of FIG. 1.

Referring to FIGS. 1-4, the preferred embodiment of the coupling device comprises a driving member 10, typically including a shaft 12 suitably mounted for rotation about the axis 14 in a manner well-known in art. Driving member 10 includes an end section 16 shown integrally formed to shaft 12, although it should be appreciated that the end section can be separately made of one or more elements suitably secured to the shaft 12 so that the end section rotates with the shaft, coaxially about the rotation axis 14. The end section 16 includes a plurality of yoke sections 18 preferably equidistant from and equiangulary disposed around the axis 14 so as to provide the symmetrical arrangement shown in FIG. 2. It will be appreciated that although three such yoke sections 18 are shown, any number can be provided in an equiangular, equidistant relationship around the axis 14 as will be more evident hereinafter. Each yoke section 18 preferably includes a slot 19 defined by a radial inner surface including a convex spherical seat 20 and two parallel spaced apart arms 22 extending from the inner surface seat in a radially outward direction. The spherical surface of seat 20 has its center of curvature at the point 24 and is centered on a radially-directed axis 26. Arms 22 of each yoke section are provided with mutually opposing parallel flat surfaces 28, preferably equidistantly spaced from opposite sides of the respective radial axis 26, each flat surface lying in a plane parallel to the plane defined by the axis 14 and the radial line 26 corresponding to the particular yoke section.

The driven member 30 comprises a shaft 32 suitably mounted for rotation about the axis 34, also in a manner well-known in the art, so that the axis 34 is preferably coaxial with the rotation axis 14 of the driving member 10 when the driving and driven members are aligned. Although the preferred embodiment is described as having the rotation axes of the driving and driven members coaxially aligned they will operate equally as well when the axes are angularly misaligned from zero to at least 30°. Driven member 30 includes a cylindrical cup end section 36 integrally formed with shaft 32, although it will be appreciated that the cylindrical cup end section can be separately made of one or more elements suitably secured to the shaft 32 so that the end section rotates with the shaft. The end section 36 is open at its end 38 opposite shaft 32 so as to receive in an operative manner the end section 16 of the driving member 10. The open end 38 of section 36 includes a radially-inward directed rim 40 coaxial with axis 34 and provided with a plurality of grooves or slots 42 equiangularly spaced around axis 34, each corresponding to a slot 19 of a yoke section 18 of the driving member 10. Each slot 42 is provided with a spherical seat 44 on its bottom outer-radial surface and mutually opposing flat parallel sides 46. Seat 44 is centered with respect to the corresponding radial line 26 and has its center of curvature coincident with point 24 when the coupling is in an unloaded condition. The parallel flat sides 46 are equidistant from the corresponding radial line 26 and disposed in planes parallel to the plane defined by axis 34 and the respective radial line 26.

A plurality of floating members 50, corresponding to the number of yoke sections 18 and slots 42, couple the driving and driven members 10 and 30. Each floating member is elongated in one direction so as to define an elongated central axis coaxial with the respective radial line 26 and coplanar with the central axes of the other members 50 when the rotation axes 14 and 34 are aligned. The outer radial end 52 of each floating member 50 is defined by a convex spherical end surface having a center of curvature coincident with point 24 so as to substantially mate with the spherical seat 44 provided in the respective slot 42. The inner radial end 54 of each floating member is defined by a concave spherical end surface also having its center of curvature coincident with point 24 so as to substantially mate with the spherical seat 20 of the respective yoke section 18.

Each floating member 50 shown in FIGS. 1–4 also includes a pair of cylindrical surfaces 56 diametrically opposite one another and provided at least at each end of the member, and preferably extending the entire length of the member. The axis of curvature of each cylindrical surface is coaxial with the elongated center axis of the member 50, and thus coaxial with the respective radial line 26. As shown, the side surfaces 58 disposed between the cylindrical surfaces 56 are non-cylindrical, and preferably flat. (see FIGS. 3 and 4).

A transition member 60 (shown in cross-section in FIG. 3) is disposed between each cylindrical surface 56 of each floating member 50, and the flat side 46 of each slot 42 at the outer radial end of each floating member 50, and between each cylindrical surface 56 and the opposing flat side 28 of the yoke section 22 at the inner radial end of each floating member 50. Each transition member 60 includes a concave cylindrical seating surface 62 having approximately the same, though larger, radius of curvature (since surface 62 is located at a greater distance from line 26) as the cylindrical surface 56 so that the former mates with the latter and is pivotal about radial line 26. Each transition member 60 also includes a flat surface 64 on its side opposite the cylindrical seating surface 62 and disposed in a mutually opposing manner opposite the flat side 28 of the yoke section 22, or opposite the flat side 46 of each slot 42.

Bearing means are provided for carrying, in compression, torque transmitted between the driving and driven members and accommodating relative pivotal motion of the driving and driven members about the point 24. More particularly, a spherical laminated bearing 70 (shown in FIGS. 1 and 2) is provided between each convex spherical end surface 52 of each floating member 50 and the corresponding concave spherical seat 44 of each slot 42, and between each concave spherical end surface 54 of each floating member 50 and the spherical seat 20 of each yoke section 18. A cylindrical laminated bearing 72 (see FIGS. 1 and 3) is provided between each concave cylindrical surface 62 of transition member 60 and the opposing convex cylindrical surface 56 of the floating member 50. Finally, a flat laminated bearing 74 is provided between the flat surface 64 of each transition member 60 and the opposing flat side 28 of yoke section 22, or the opposing flat side 46 of each slot 42. Each laminated bearing preferably includes alternating layers of a resilient, elastomeric material and a nonextensible material. Each bearing is preferably a "high compression laminate" bearing unit and is secured, preferably by bonding, to the opposing bearing surfaces, and accordingly, take general shape of those surfaces. Preferably, the resilient layers of each laminate is made of an elastomeric material such as rubber or certain plastics, while the nonextensible layers are made, for example, of a reinforced plastic, metal or a metal alloy, such as stainless steel. The alternating layers of each laminate are secured together and to the opposing bearing surfaces in any suitable manner, such as a suitable bonding cement.

The particular design of each of the laminated bearing means described is largely dependent upon the intended use. The size, thickness and number of layers of each bearing and the shear modulus of each layer of elastomeric material depends, for example, on the particular compression loads to be expected and the amount of angular misalignment between member 10 and 30 that can be tolerated. The advantages of such bearings are described in U.S. Pat. No. 4,208,889 issued to Robert R. Peterson on June 24, 1980. Generally, by utilizing such bearing units, undesirable vibration can be at least partially dampened and noise, as well as vibration-induced wear and stress reduced. Further, due to the resiliency of the elastomeric material, each bearing provides counteracting restoring forces to uneven compression and shearing loads. Of importance, use of such laminated bearings eliminates the costly needs associated with providing lubrication between the various bearing surfaces. Further, the use of elastomeric bearings reduces the chances of catastrophic failure.

Figure 5:
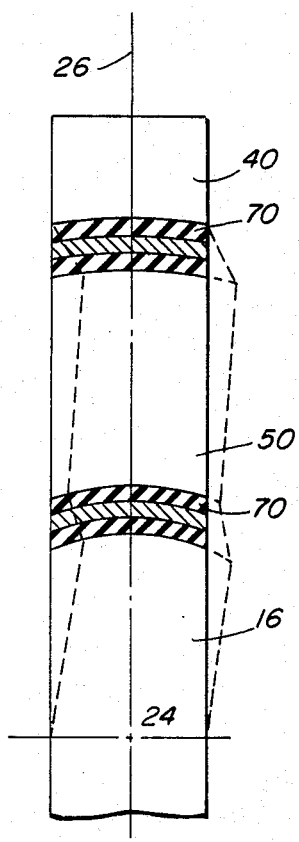
FIG. 5 is a partial axial cross-sectional view similar to the one shown in FIG. 2 and illustrating the deformation of the spherical bearings in response to angular misalignment between the driving and driven members.

In operation, a torque load is transmitted from the driving member 10 to the driven member 30 so as to cause the member 10 to rotate about the rotation axis 14. This torque load is carried in compression by the flat bearings 74 and the cylindrical bearings 72 opposing the direction of rotation of the member 10. Any angular misalignment occuring between members 10 and 30 will result in the two members pivoting about the common point 24. This motion as shown best in FIG. 5 will be carried in shear by spherical bearings 70 and flat bearings 74. This pivoting motion is carried by the spherical laminated bearings 70 and flat bearings 74 in shear as the shafts 12 and 32 rotate about their axes. In this regard, all of the spherical bearings (i.e., both those disposed adjacent both the inner and outer radial ends of the floating members) are preferably designed to have balanced angular spring rates about the common point 24 in each plane defined by the rotation axes 14 and 34 and the respective radial line 26 (as indicated by arrow 80 in FIG. 2). In a similar manner, all of the flat bearings 74 are preferably provided with balanced angular spring rates about the common point 24 in each plane defined by rotation axes 14 and 34 and the respective radial line 26 so as to provide a constant velocity coupling whereby the elongated axes of each floating member will remain in the homokinetic plane when angular misalignment occurs. The angular spring rates of the respective set of spherical or flat bearings are considered balanced where the individual spring rate of each bearing is determined as a function of the distance of the bearing from the common point 24 so that the floating member remains in the homokinetic plane regardless of deflections of the coupling. Generally, the product of the spring constant and the distance from the center point 24 is roughly equal for all of the spherical bearings and roughly equal for all of the flat bearings. Due to the nature of the laminated bearing means (to provide restoring forces when subjected to loads of this type), the shafts will tend to move back into axial alignment. The axial positions of the shafts will thus be restored due to the restoring forces provided in each of the flat bearings 74 and spherical bearings 70 in response to shear.

Finally, any axial misalignment of either member 10 or 30 where the axes 14 or 34 tend to shift relative to one another, from the point 24, will be resisted by the compression of the spherical bearings 70. It should be appreciated that although part of the structure in FIGS. 1–5 is described as part of the driving member and another part of the structure is described as the driven member, the coupling would work equally as well with these reversed. Further, various changes may be made in the embodiment described in FIGS. 1–5 without departing from the scope of the invention.

Figure 6:
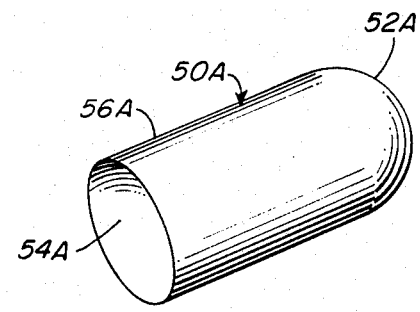
FIG. 6 is an alternative embodiment of the floating member.
Figure 4:
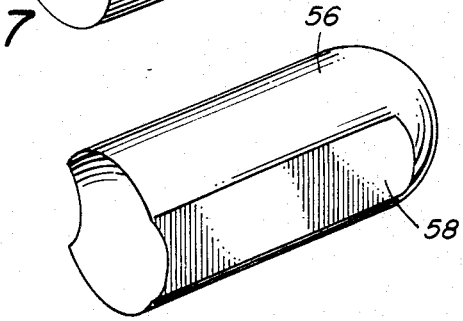
FIG. 4 is a perspective view of the floating member of coupling device shown in FIG. 1.

For example, the floating member can take shapes other than the one shown and described with respect to FIGS. 1–4. For example, as shown in FIG. 6 the floating member 50A is shown as a right angled cylinder having one end formed with the convex spherical surface 52A and its other end formed with the concave spherical surface 52B, each end surface being centered about the elongated center axis of the member 50A. In this embodiment the cylindrical side surface 56A of the member extends 360° around the member.

Figure 7:
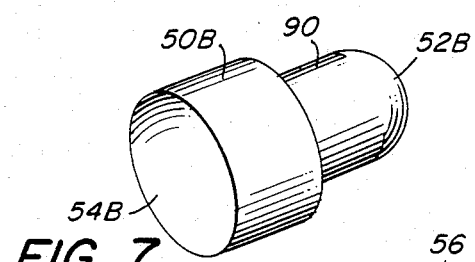
FIG. 7 is another alternative embodiment of the floating member.

In FIG. 7, the floating member 50B includes a first cylindrical portion 90 disposed at the outer radial end of the member and thus, provided with the convex spherical end surface 52B and a second cylindrical portion 92 disposed at the inner radial end of the member and thus provided with the concave spherical end surface 54B, each spherical surface being centered about the elongated center axis of the member. The first cylindrical end portion 90 is of a smaller cross-sectional diameter than that of the second cylindrical end portion 92 so that the cylindrical and flat bearings (i.e., larger in surface area) at the inner radial end are smaller than the corresponding cylindrical and flat bearings at the inner radial end so as to accommodate greater loads. It will be appreciated that changes in the dimensions of the bearings, transition members, and yoke sections of the driving member are changed relative to the corresponding parts of the driven member in order to accommodate the floating member 50B.

Figure 8:
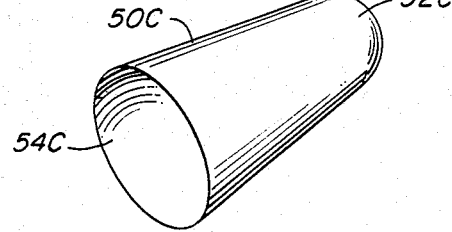
FIG. 8 is yet another embodiment of the floating member.

Yet another alternative structure of the floating member is shown at 50C in FIG. 8. The member 50C is formed as a frusto-conical member having a larger cross-sectional diameter at its inner radial end (formed with the concave spherical surface 54C) than that at its outer radial end (formed with the convex spherical surface 52C) so that greater load area is provided at the inner radial end. It should be appreciated that only the shape of the transition members need be changed to accommodate the member 50C. For example, a concave frusto-conical surface can be substituted for the concave cylindrical surface 62 of the transition member 60 shown in FIG. 3. In this instance the thickness of the transition member will decrease from its inner radial end to its outer radial end so that the flat surface 64 secured to the particular flat bearing 74 is still provided.

The invention has various advantages. By utilizing the elongated floating members greater torque loads can be carried, compared to a Peterson Ball Joint Coupling having a number of balls equal to the number of floating members in the present design. Further, fewer floating members are required with the present design than provided in the Peterson Ball Joint Coupling in order to carry the same torque load. Finally, fewer elastomeric sections for a given torque load are required with the present, more space efficient design than previously required in the Peterson Ball Joint Coupling.

Finally, while the preferred embodiment shown in the drawings is a fixed joint coupling, a plunging joint can be easily provided. For example, a plurality of flat bearings, one associated with each floating member, can be incorporated into the structure shown to accommodate movement of one of the shafts in the direction of its rotation axis. More specifically, the spherical seat 44 can be replaced with a flat surface at the outer radial end of each slot 42. An additional transition member can be added having a flat surface opposing the outer-radial flat surface of each slot and a flat laminated bearing disposed between these two flat surfaces. The additional transition member associated with each slot 42 can be provided with a spherical surface opposite its flat surface and identical to the spherical seat 44 so that it mates with the spherical bearing 70. In such an arrangement each additional flat bearing provided at the outer radial end of each slot would be oriented in a plane perpendicular to the two flat bearings 74 disposed at the sides of the corresponding slot, and parallel to the axis 34 of the shaft 32 of the member 30 so that the shafts 12 and 32 are relatively moveable in the direction of the axis 34.

Since certain other changes may be made in the above apparatus without departing from the scope of the invention herein involved, it is intended that all matter contained in the above description or shown in the accompanying drawing shall be interpreted in an illustrative and not in a limiting sense.

What is claimed is:

1. A coupling device comprising, in combination:
   a driving member mounted for rotation about a first axis;
   a driven member mounted for rotation about a second axis;
   a plurality of intermediate floating members circumferentially spaced around said first and second axes and coupling said driving and driven members so that said first and second axes tend to intersect at a common point when axially misaligned, each of said floating members being elongated in one direction and having (1) an elongated central axis extending radially with respect to said first and second axes through said common point and lying in a common plane with the elongated central axes of the other ones of said floating members, (2) an outer radial end defined by a convex spherical end surface having a center of curvature coincident with said common point, and (3) an inner radial end defined by a concave spherical end surface having a center of curvature coincident with said common point;

first means for coupling the inner radial end of each of said floating members to one of said driving and driven members, said first means including bearing means disposed between each said floating member and said one member; and second means for coupling the outer radial end of each of said floating members to the other of said driving and driven members, said second means including bearing means disposed between each said floating member and the other of said driving and driven members;

wherein said bearing means of said first and second means carries in compression torque transmitted between said driving and driven members and accommodates relative pivotal motion between said driving and driven members about said common point.

2. A device according to claim 1, wherein said bearing means includes first laminated bearing means, second laminated bearing means, and third laminated bearing means, said first and second laminated bearing means being capable of carrying in shear relative rotational motion between each of said floating members and said driving member about the corresponding elongated central axis and between each of said floating members and said driven member about the corresponding elongated central axis, said second and third laminated bearing means being capable of carrying in shear relative pivotal movement of said driving and driven members about said common point and said first and third laminated bearing means being capable of carrying in compression torque transmitted between said driving and driven members.

3. A device according to claim 2, wherein said first laminated bearing means includes cylindrical laminated bearings, each having an axis of curvature coaxial with the elongated axis of the respective one of said floating members, said second bearing means includes spherical laminated bearings, one disposed adjacent each of the spherical end surfaces of said inner and outer radial ends of each of said floating members and having a center of curvature coincident with said common point, and said third bearing means includes flat laminated bearings disposed between each of said floating members and the driving member and each of the floating members and the driven member and oriented in a plane substantially parallel to the plane defined by the elongated axis of the corresponding floating member and said first and second axes.

4. A device according to claim 3, wherein first means includes a transition member disposed between each cylindrical laminated bearing and a corresponding one of the flat laminated bearings.

5. A device according to claim 4, wherein each of said floating members is cylindrical and each of said cylindrical laminated bearings is disposed between a transition member and a floating member.

6. A device according to claim 5, wherein each of said cylindrical floating members includes a first cylindrical portion disposed at said inner radial end and a second cylindrical portion disposed at said outer radial end, said first and second cylindrical portions being of different diameters.

7. A device according to claim 6, wherein the diameter of said first cylindrical portion is larger than the diameter of said second cylindrical portion.

8. A device according to claim 5, wherein each of said cylindrical floating members includes a pair of cylindrical surfaces having a common center axis of curvature aligned with the elongated central axis of the floating member and disposed diametrically opposite one another and in contact with separate ones of said cylindrical laminated bearings, and non-cylindrical surfaces disposed parallel to the elongated central axis of the floating member between said pair of cylindrical surfaces.

9. A device according to claim 5, wherein each of said cylindrical floating members includes a cylindrical surface coaxially disposed around said elongated central axis of the floating member and in contact with diametrically-opposed ones of said cylindrical laminated bearings.

10. A device according to claim 4, wherein each of said floating members is frusto-conical and each of said cylindrical laminated bearings is disposed between a transition member and a floating member.

11. A device according to claim 1, wherein said common plane is the homokinetic plane so that said device is a constant velocity coupling.

12. A constant velocity coupling device comprising, in combination:

a driving member mounted for rotation about a first axis;

a driven member mounted for rotation about a second axis;

a plurality of intermediate members floating relative to the driving and driven members and circumferentially spaced around said first and second axes and coupling said driving and driven members so that said first and second axes tend to intersect at a common point when axially misaligned, each of said floating members being elongated in one direction and having an elongated central axis extending radially with respect to said first and second axes through said common point and lying in a common plane with the elongated central axes of the other ones of said floating members;

means for coupling each of said floating members to said driving and driven members, said means including bearing means disposed between each said member and said driving and driven members, said bearing means carrying in compression torque transmitted between said driving and driven members and accommodating relative pivotal motion between said driving and driven members about said common point.

* * * * *